(12) United States Patent
Suryabudi et al.

(10) Patent No.: US 8,769,232 B2
(45) Date of Patent: Jul. 1, 2014

(54) NON-VOLATILE SEMICONDUCTOR MEMORY MODULE ENABLING OUT OF ORDER HOST COMMAND CHUNK MEDIA ACCESS

(75) Inventors: Dominic S. Suryabudi, Irvine, CA (US); Mei-Man L. Syu, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 415 days.

(21) Appl. No.: 13/080,800

(22) Filed: Apr. 6, 2011

(65) Prior Publication Data
US 2012/0260020 A1   Oct. 11, 2012

(51) Int. Cl.
*G06F 12/00* (2006.01)
*G06F 13/00* (2006.01)
*G06F 13/28* (2006.01)

(52) U.S. Cl.
USPC ........... 711/169; 711/103; 711/125; 711/150; 711/151; 711/168

(58) Field of Classification Search
USPC .................. 711/103, 125, 150–151, 167–169
See application file for complete search history.

(56) References Cited

U.S. PATENT DOCUMENTS

| | | | |
|---|---|---|---|
| 7,533,223 B1 * | 5/2009 | Vartti et al. .................... 711/151 |
| 2009/0164729 A1 * | 6/2009 | Robinson ...................... 711/125 |
| 2010/0023682 A1 | 1/2010 | Lee et al. | |
| 2010/0180105 A1 | 7/2010 | Asnaashari | |
| 2011/0161552 A1 * | 6/2011 | Lund et al. .................... 711/103 |

* cited by examiner

*Primary Examiner* — Ryan Bertram

(57) ABSTRACT

A non-volatile semiconductor memory module is disclosed comprising a memory device and memory controller operably coupled to the memory device, wherein the memory controller is operable to receive a host command, split the host command into one or more chunks comprising a first chunk comprising at least one logical block address (LBA), and check the first chunk against an active chunk coherency list comprising one or more active chunks to determine whether the first chunk is an independent chunk, and ready to be submitted for access to the memory device, or a dependent chunk, and deferred access to the memory device until an associated dependency is cleared.

26 Claims, 4 Drawing Sheets

NON-VOLATILE SEMICONDUCTOR MEMORY MODULE ENABLING OUT OF ORDER HOST COMMAND CHUNK MEDIA ACCESS

BACKGROUND

A non-volatile semiconductor memory (NVSM) module may be employed as mass storage for a computer system (e.g., desktop, laptop, portable, etc.) or a consumer device (e.g., music player, cell phone, camera, etc.) or other suitable application. The NVSM module may comprise one or more memory devices (such as a flash memory) and memory controller for accessing each memory device via a channel including an I/O bus. The memory controller may receive commands, such as write or read commands from a host and submit each command to a memory device. When submitting a write command to a memory device, the memory controller transfers the address and the write data over the I/O bus. When submitting a read command, the memory controller transfers the address over the I/O bus and then receives the read data over the I/O bus.

However, the host may perform reads and writes to any physical location in the one or more memory devices via respective read and write commands. Consequently, it is the responsibility of the memory controller to ensure that all of the commands are performed on the one or more memory devices in the order dictated by the host. This is commonly achieved by using a command based coherency scheme. However, if multiple host commands are accessing a common physical area of a memory device, the command based coherency scheme requires that the commands be executed one at a time, in the same order in which the commands are received.

DETAILED DESCRIPTION OF EMBODIMENTS OF THE INVENTION

Figure 1:
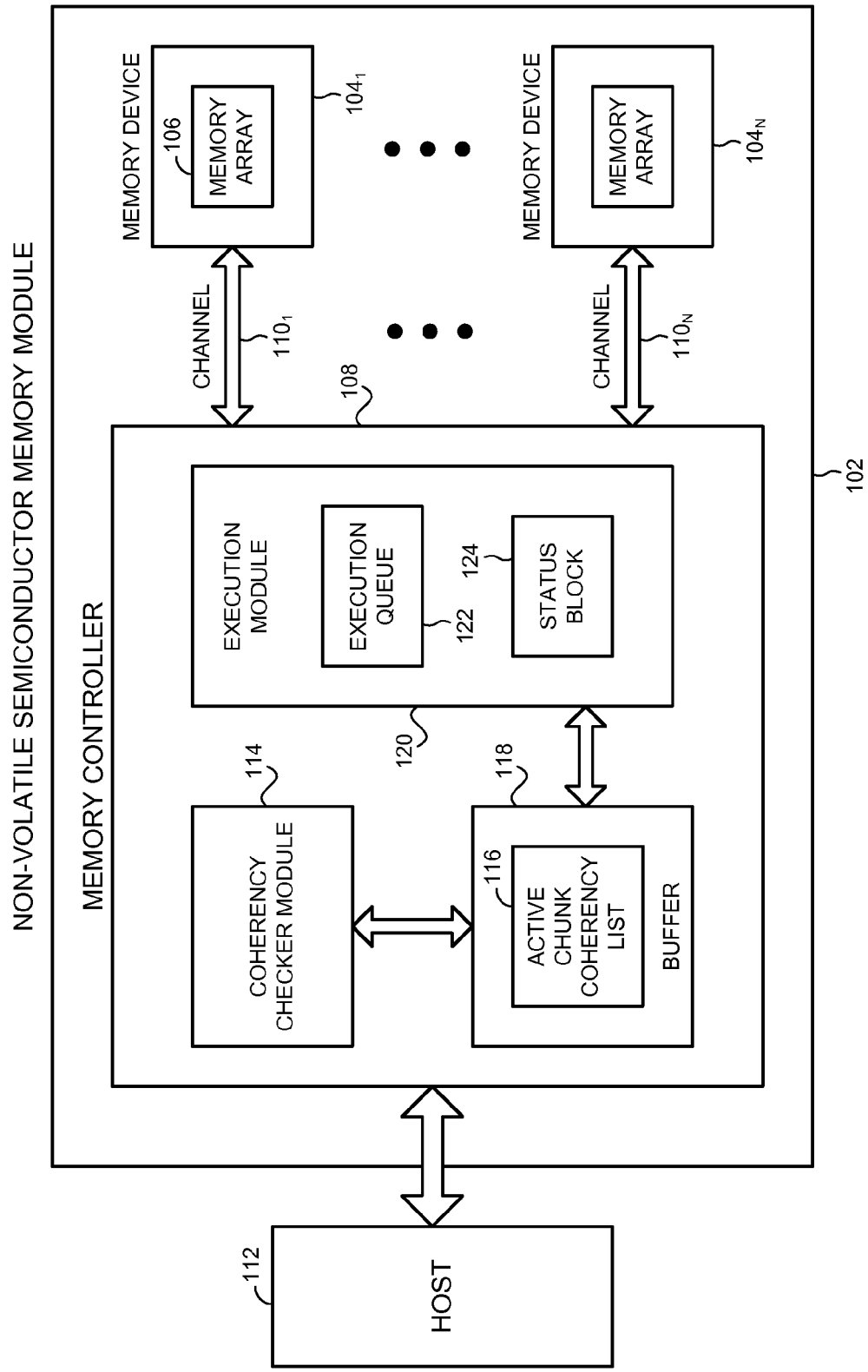
FIG. 1 shows a non-volatile semiconductor memory module comprising a memory controller operably coupled to a plurality of memory devices, wherein the memory controller comprises a coherency checker module and a buffer comprising an active chunk coherency list, according to an embodiment of the present invention.

FIG. 1 shows a non-volatile semiconductor memory module 102 according to an embodiment of the present invention comprising N memory devices $104_1$-$104_N$ each comprising a memory array 106. In one embodiment, each memory array 106 comprises a plurality of blocks, where each block comprises a plurality of memory segments referred to as pages. The memory segment that is accessed during write/read commands may comprise any suitable size, such as a full page or a partial page in a block of pages.

The non-volatile semiconductor memory module 102 further comprises a memory controller 108 operably coupled to each of the memory devices $104_1$-$104_N$ via respective channels $110_1$-$110_N$, wherein each channel comprises an I/O bus for transferring write/read data between an associated memory device and the memory controller 108. The non-volatile semiconductor memory module 102 may comprise any suitable configuration of memory controller 108 and the memory devices $104_1$-$104_N$. In the embodiment of FIG. 1, each one of the memory devices $104_1$-$104_N$ comprises a suitable flash memory (e.g., NAND or NOR flash), and the memory controller comprises a flash memory controller. In one embodiment, each memory device $104_1$-$104_N$ may comprise, for example, phase-change random access memory (PRAM), resistive-change RAM (ReRAM), magnetoresistive RAM (MRAM) or other suitable type of non-volatile semiconductor memory.

In one embodiment, the memory controller 108 implements a solid state drive (SSD) by emulating a disk drive accessible by a host system using a standard disk drive communication protocol (e.g., the ATA protocol). The host 112 in this embodiment may comprise a separate microprocessor (e.g., in a desktop or laptop computer) which communicates with the SSD over a suitable interface (e.g., serial or parallel ATA). In an alternative embodiment, the non-volatile semiconductor memory module 2 may be implemented within a consumer device (e.g., a camera or cell phone).

In one embodiment, the non-volatile semiconductor memory module 102 is implemented with a hard disk drive (HDD) in a hybrid drive, wherein the memory controller 108 communicates with the HDD via a bridge using one interface (e.g., an Embedded MultiMedia Card (eMMC), Universal Flash Storage (UFS), or Open NAND Flash Interface (ONFI) interface). The host 112 in this embodiment may communicate with the HDD using another interface (e.g., a serial ATA (SATA) or serial attached SCSI (SAS) interface). In one embodiment, one or more non-volatile semiconductor memory modules 102 are implemented with a bridge in a storage device, wherein the host 112 communicates with the bridge via one interface (e.g., a SAS interface) and each of one or more non-volatile semiconductor memory modules 102 communicates with the bridge via a another interface (e.g., a SATA interface).

In the embodiment of FIG. 1, the memory controller 108 comprises a coherency checker module 114 operable to split each command received from the host 112 into one or more chunks, wherein each chunk has a size corresponding to at least one programming unit of flash memory. In one embodiment, the at least one programming unit corresponds to a page of flash memory. In the embodiment of FIG. 1, the coherency checker module 114 is further operable to determine if each chunk in a current host command is an independent chunk or a dependent chunk by checking each chunk against an active chunk coherency list 116 comprising one or more active chunks (i.e., chunks that have been split from previously received host commands, but have not completed execution in one of the memory devices $104_1$-$104_N$). In the embodiment in FIG. 1, the active chunk coherency list 116 is store in the buffer 118. In one embodiment, the active chunk coherency list 116 is stored in the coherency checker module 114. In an embodiment of the invention, the coherency checker module 114 is further operable to receive commands (e.g., read and write commands) from the host 112. Additional details regarding the active chunk coherency list will be provided below in conjunction with the description of FIG. 2.

In an embodiment of the invention, an independent chunk is ready to be submitted for access to a memory device, while a dependent chunk is deferred access to a memory device until an associated dependency is cleared. In one embodiment, the associated dependency of the dependent chunk is cleared when an active chunk on which the dependent chunk is dependent completes execution in a memory device. In one embodiment, an active chunk comprises at least one logical block address (LBA). In an embodiment, an active chunk comprises eight LBAs.

In the embodiment in FIG. 1, the memory controller 108 further comprises a buffer 118 communicatively coupled to the coherency checker module 110, wherein the buffer 118 stores chunks that have been split off from host commands in the coherency checker module 110. The buffer 118 comprises volatile memory, such as dynamic random access memory (DRAM) or static random access memory (SRAM). In an embodiment of the invention, the buffer 118 receives commands (e.g., read and write commands) from the host 112.

In the embodiment in FIG. 1, the memory controller 108 further comprises an execution module 120 communicatively coupled to the buffer 118 and operable to receive chunks from the buffer 118, and submit the chunks for access to an appropriate memory device. In the embodiment in FIG. 1, the execution module 120 comprises an execution queue 122 for temporarily storing chunks of host commands that have been cleared for submission for memory device access until an appropriate memory device becomes available. In the embodiment in FIG. 1, the execution module 120 further comprises a status block 124 for receiving status (e.g., a chunk completed indication) from each of the memory devices $104_1$-$104_N$ of chunks that have been submitted for memory device access. In one embodiment, the execution queue 122 comprises a multiple separate execution queues that are each operably coupled to one of the memory devices $104_1$-$104_N$ via one of channels $110_1$-$110_N$, wherein each separate execution queue provides access to only one memory device. In an alternative embodiment, the execution queue 122 comprises a global execution queue for providing temporary storage for chunks that are cleared for submission to any one of the memory devices $104_1$-$104_N$.

Figure 2:
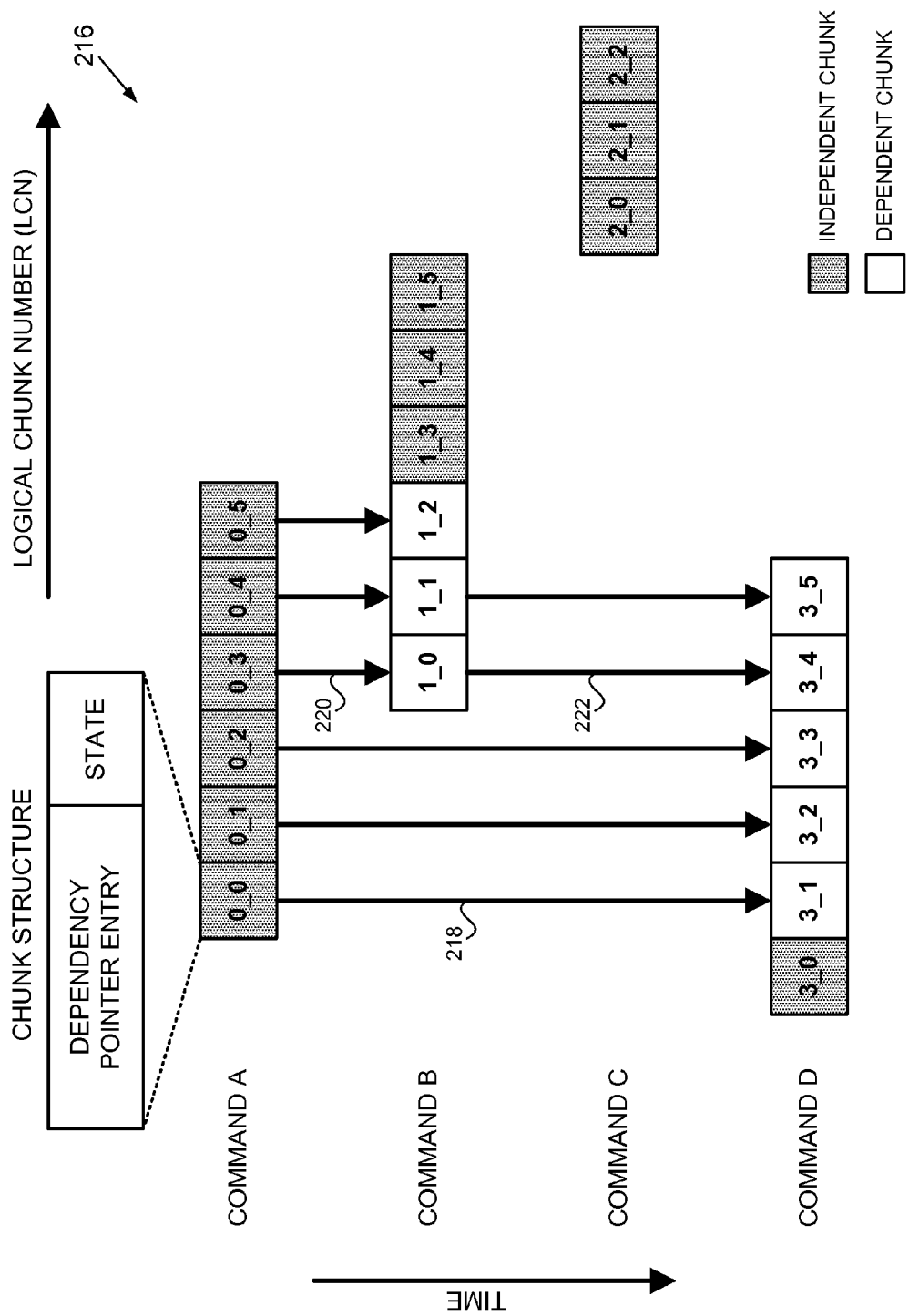
FIG. 2 illustrates an active chunk coherency list comprising active chunks that have been split from previously received host commands according to an embodiment of the present invention.

FIG. 2 illustrates an active chunk coherency list according to an embodiment of the present invention. In the active chunk coherency list 216 in FIG. 2, active chunks 0_0-0_5 are associated with command A, active chunks 1_0-1_5 are associated with command B, chunks 2_0-2_2 are associated with command C, and active chunks 3_0-3_5 are associated with command D. In the example shown in FIG. 2, independent chunks are designed by dark shading and dependent chunks are designated by an absence of shading. In one embodiment, a dependency link is formed between two active chunks when one of the active chunks overlaps the other active chunk, wherein an overlap occurs between two active chunks when at least one LBA in one of the active chunks is the same as at least one LBA in the other active chunk. In an embodiment, active chunks are dependent because they are accessing the same Logical Chunk Number (LCN) with one or more other active chunks.

In one embodiment, a dependency between two active chunks is designated by a dependency pointer, wherein the dependency pointer points from the overlapping chunk to the overlapped chunk (i.e., the dependent chunk). In an embodiment, an independent chunk is cleared for submission to one of the memory devices because it (i.e., the independent chunk) does not have a dependency with another active chunk. In contrast, a dependent chunk must wait to be submitted for access to a memory device until the active chunk with which it is dependent completes execution in a memory device and the dependency link with the completed active chunk is cleared.

In the embodiment in FIG. 2, a dependency pointer 218 indicates that active chunk 3_1 is dependent on active chunk 0_0, a dependency pointer 220 indicates that active chunk 1_0 is dependent on active chunk 0_3, and a dependency pointer 222 indicates that active chunk 3_4 is dependent on active chunk 1_0. In the active chunk coherency list 216 in FIG. 2, a dependency link is formed, for example, between active chunks 0_0 and 3_1, between active chunks 0_3 and 1_0, and between active chunks 1_0 and 3_4. In the embodiment in FIG. 2, independent chunks 3_0, 0_0-0_5, 1_3-1_5, and 2_0-2_2 are cleared for submission for access to a memory device, while dependent chunks 3_1-3_5 and 1_0-1_2 must each wait for submission for memory device access until an associated dependency link with another active chunk is cleared. In the embodiment in FIG. 2, command B was received from the host prior to command C. However, independent chunks 2_0-2_2 from command C are cleared for memory device access while dependent chunks 1_0-1_2 from command B must wait for to be submitted for memory device access until respective independent chunks 0_3-0_5 from command A complete execution in a memory device. Thus, an embodiment of the invention enables independent chunks to be submitted out of order for memory device access.

In one embodiment, each active chunk has a structure comprising a dependency pointer entry and a state indication. In an embodiment, the chunk state indication can be, for example, active, inactive, waiting, reading, or writing. In an embodiment, when two active chunks overlap, a dependency link is formed between the active chunks and a dependency pointer is marked in the dependency pointer entry in the active chunk that is independent with respect to the other active chunk. When the independent chunk completes execution in a memory device, the dependency link is cleared, thereby triggering the dependent chunk for submission for memory device access. For example, in the active chunk list 216 in FIG. 2, since active chunk 0_0 overlaps active chunk 3_1, a dependency link is formed between active chunks 0_0 and 3_1 and a dependency pointer 218 is marked in the dependency pointer entry in the structure of active chunk 0_0. When active chunk 0_0 completes execution in a memory device, the dependency link is cleared, thereby triggering active chunk 3_1 to be submitted for memory device access.

In one embodiment, after each active chunk associated with a host command has completed execution in a memory device, all of the active chunks associated with that host command are removed from the active chunk list. For example, in the active chunk list 216 in FIG. 2, when active chunks 0_0-0_5 associated with host command A have each completed execution in a memory device, active chunks 0_0-0_5 are all removed from active chunk list 216.

In the active chunk coherency list 216 in FIG. 2, active chunks are ordered horizontally according to increasing LCN, and ordered vertically according to time of entry into the active chunk list 216. Thus, active chunks 3_0-3_5 associated with command D are the latest active chunks in the active chunk coherency list 216, while active chunks 0_0-0_5 associated with command A are the oldest active chunks in the active chunk list 216. In one embodiment, when a new host command is split into one or more chunks in the coherency checker module 114 (FIG. 1), each of the chunks is checked for dependency against each active chunk in the active chunk list, proceeding from most recent to oldest active chunk. The dependency check for each chunk in the new host command ends when an overlapped active chunk is identified or when all of the active chunks have been checked without identifying an overlapped chunk. For example, in the active chunk coherency list 216 in FIG. 2, a chunk from a new host command is first checked for a dependency against active chunks 3_0-3_5, and then checked against active chunks 2_0-2_2, and so forth until an overlapping chunk is identified or the end of the active chunk list 216 is reached.

Figure 3:
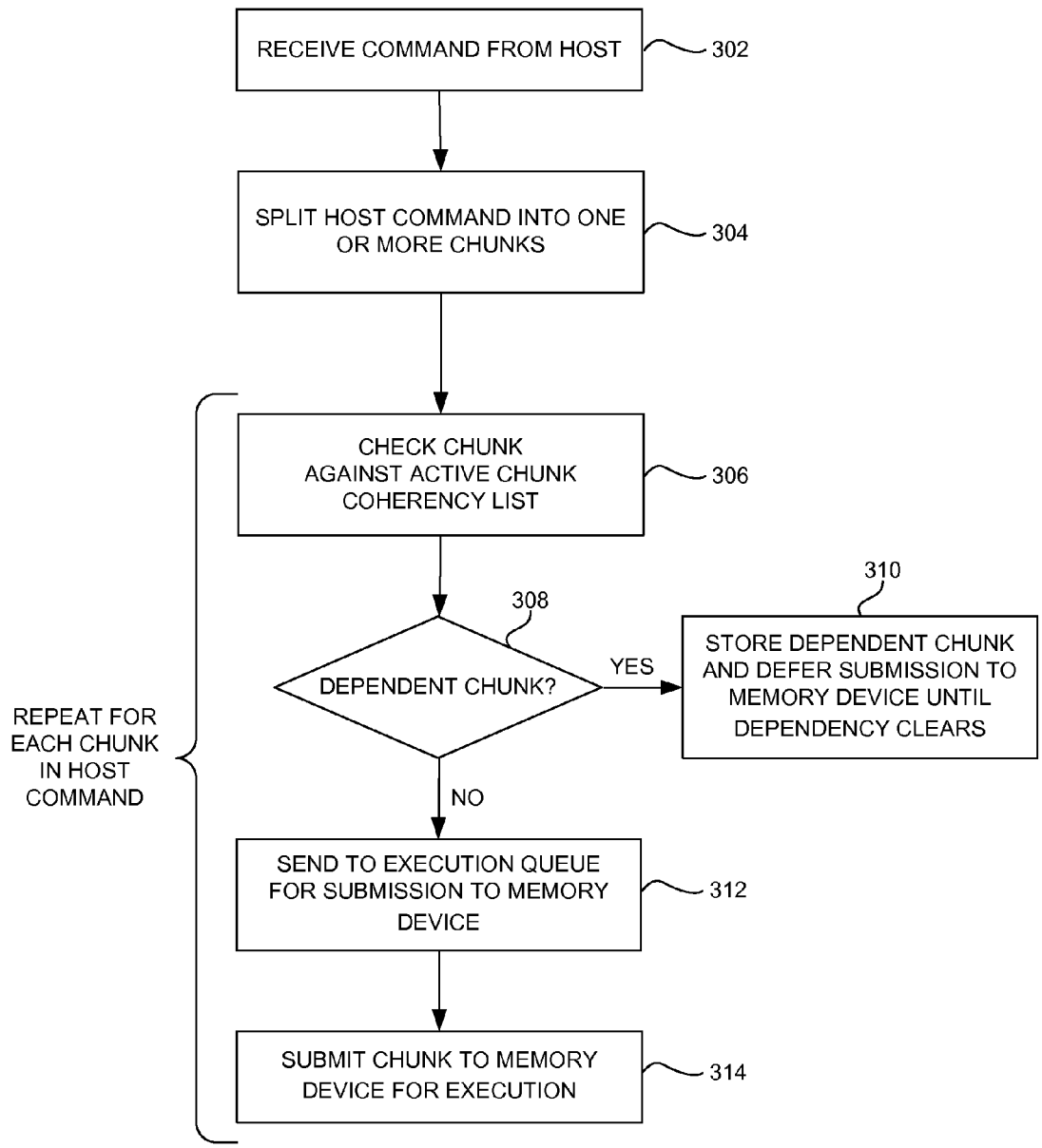
FIG. 3 is a flow diagram according to an embodiment of the present invention wherein a host command is split into one or more chunks, and each chunk is evaluated for dependency against previously received active chunks in an active chunk coherency list.

FIG. 3 is a flow diagram executed by the memory controller 108 in FIG. 1 according to an embodiment of the present invention, wherein the memory controller 108 receives a command from the host (step 302), and splits the host command (e.g., read or write command) into one or more chunks (step 304). In one embodiment, each chunk has a size that corresponds to at least one programming unit of flash memory. In an embodiment of the invention, the at least one programming unit corresponds to a page of flash memory. For each chunk, the memory controller 108 checks the chunk against the active chunk coherency list (step 306), and determines if the chunk is a dependent chunk (step 308). In one embodiment, the active chunk coherency list includes one or more active chunks, wherein each active chunk is associated with a previously received host commands (e.g., read or write commands), and wherein an "active" chunk refers to a chunk that has not completed execution in a memory device. In an embodiment, each chunk in the current host command is checked against each active chunk in the active chunk coherency list in order from latest to oldest active chunk until an overlapped active chunk is identified or all of the active chunks in the list have been checked, wherein two chunks overlap when at least one LBA is the same in each chunk. If an overlapped active chunk is found in the active chunk coherency list, the current chunk that is being checked is identified as a dependent chunk. In one embodiment, a dependency link is established between the overlapped active chunk and the current chunk, and a dependency pointer is marked in an entry in the structure of the overlapped active chunk.

In the embodiment of the invention shown in FIG. 3, if the current chunk that is being checked for a dependency is determined to be a dependent chunk, the memory controller 108 stores the dependent chunk and defers submission for access to a memory device until the dependency is cleared (step 310). In one embodiment, the dependent chunk is stored in the buffer 118 (FIG. 1). In an embodiment, the dependency is cleared after the active chunk that is linked to the dependent chunk has completed execution in a memory device and a dependency link previously formed between the two chunks is cleared. If the current chunk that is being checked for a dependency is determined to be an independent chunk, the memory controller 108 sends the independent chunk to the execution queue 120 (FIG. 1) for submission to one of the memory devices 104₁-104ₙ (FIG. 1) (step 312). In the embodiment in FIG. 3, the memory controller 108 submits the independent chunk to a memory device when the memory device is available (step 314). In the embodiment of the invention in FIG. 3, steps 306, 308, 310, 312, and 314 are repeated by the memory controller 108 as appropriate for each chunk in the current host command.

Figure 4:
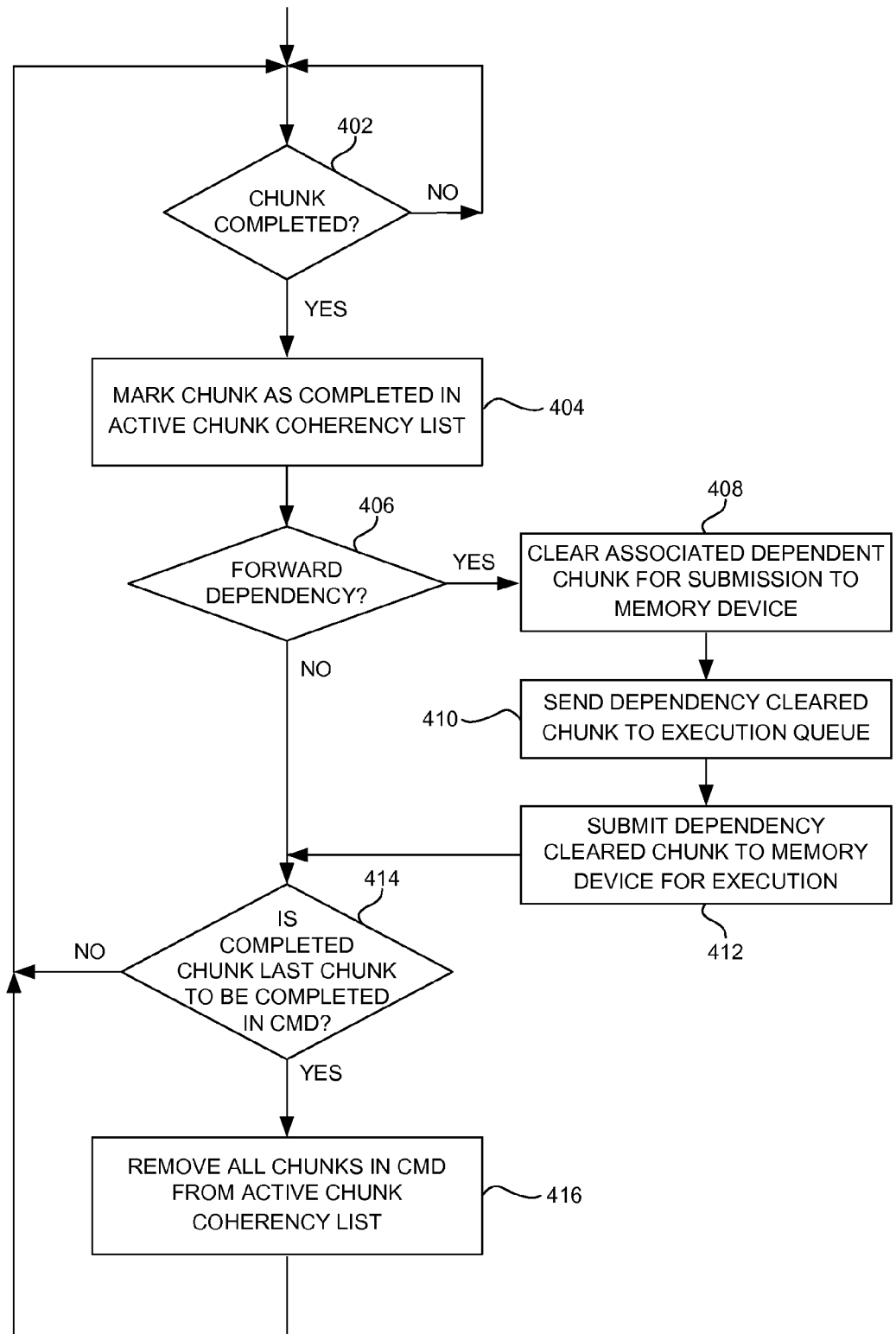
FIG. 4 is a flow diagram according to an embodiment of the present invention wherein each active chunk that has completed execution in a memory device is checked for a forward dependency, and if a forward dependency is detected, an associated dependent active chunk is cleared for submission for memory device access.

FIG. 4 is a flow diagram executed by the memory controller 108 in FIG. 1 according to an embodiment of the present invention, wherein, when an active chunk has completed execution in a memory device 104 in FIG. 1 (step 402), the memory controller 108 marks the active chunk as completed in the active chunk coherency list (step 404), and checks the completed active chunk for a forward dependency (step 406). In one embodiment, a forward dependency is indicated by a dependency pointer that is marked in a dependency pointer entry in the completed active chunk, wherein the dependency pointer indicates an active chunk that is dependent on the completed active chunk.

In the embodiment in FIG. 4, if the forward dependency check indicates a forward dependency, the memory controller 108 clears an associated dependent chunk for submission to a memory device (step 408), sends the dependency cleared active chunk to the execution queue (step 410), and submits the dependency cleared active chunk to the memory device when the memory device is available (step 412). In one embodiment, the associated dependent chunk is cleared for submission to a memory device by clearing a dependency link previously formed between the associated dependent active chunk and the completed active chunk. In one embodiment, a dependency point in the completed active chunk indicates the associated dependent chunk to be cleared for memory device submission.

In the embodiment in FIG. 4, if a forward dependency is not indicated in the completed active chunk (step 406), or a forward dependency is indicated and the associated dependent chunk is submitted to a memory device for execution (step 412), the memory controller 108 determines if the completed active chunk is the last active chunk to be completed in an associated host command (step 414). If the completed active chunk is determined to be the last active chunk in the associated host command to be completed, the memory controller 108 removes all of the active chunks in the associated host command from the active chunk coherency list (step 416). However, if the completed active chunk is not the last active chunk in the associated host command to be completed, the memory controller 108 leaves the completed active chunk in the active chunk coherency list until all of the remaining active chunk(s) in the associated host command have completed execution in a memory device.

It is noted that the steps in the flow diagrams in FIGS. 3 and 4 are shown in a particular order to illustrate respective embodiments of the invention. In other embodiments, the steps in the flow diagrams in FIGS. 3 and 4 may be performed in a different order.

The memory controller 108 in the non-volatile semiconductor memory module 102 (FIG. 1) may comprise any suitable circuitry, such as one or more integrated circuits. In one embodiment, the memory controller 108 comprises a microprocessor executing code segments of a control program for implementing the above described flow diagrams. Alternatively, or in addition to the microprocessor, the memory controller 108 may comprise state machine circuitry implemented in an application specific integrated circuit.

What is claimed is:
1. A non-volatile semiconductor memory module comprising:
a memory device; and
a memory controller operably coupled to the memory device, the memory controller operable to:
receive a command from a host;
split the command into one or more chunks, the one or more chunks comprising a first chunk associated with at least one logical block address (LBA);
check the first chunk against an active chunk coherency list including entries associated with each of one or more active chunks to determine whether the first chunk overlaps one of the one or more active chunks at least in part by determining whether the first chunk accesses a same Logical Chunk Number (LCN) as one of the one or more active chunks;

when it is determined that the first chunk does not overlap one of the one or more active chunks, submit the first chunk to the memory device; and when it is determined that the first chunk overlaps one of the one or more active chunks, store a forward dependency pointer identifying the first chunk in an entry associated with the overlapped chunk, and defer submission of the first chunk to the memory device until an associated dependency link is cleared.

2. The non-volatile semiconductor memory module as recited in claim 1, wherein the entries of the active chunk coherency list each include a state indication field indicating a state associated with the respective chunk.

3. The non-volatile semiconductor memory module as recited in claim 1, wherein the memory controller is further operable to clear the dependency link after the overlapped chunk has completed execution in the memory device.

4. The non-volatile semiconductor memory module as recited in claim 1, wherein the forward dependency pointer triggers submission of the first chunk to the memory device after the overlapped chunk has completed execution in the memory device.

5. The non-volatile semiconductor memory module as recited in claim 1, wherein the memory controller is further operable to determine that the first chunk overlaps one of the one or more active chunks when at least one LBA associated with the first chunk is the same as at least one LBA associated with the active chunk.

6. The non-volatile semiconductor memory module as recited in claim 1, wherein the memory controller comprises a buffer, and wherein the controller is further operable to store the first chunk in the buffer until the dependency link is cleared.

7. The non-volatile semiconductor memory module as recited in claim 1, wherein each of the one or more active chunks associated with entries in the active chunk coherency list have not completed execution in the memory device.

8. The non-volatile semiconductor memory module as recited in claim 1, wherein the one or more chunks further comprise a second chunk, wherein the second chunk is associated with at least one LBA, and wherein the memory controller is operable to:

determine that the second chunk does not overlap any of the one or more active chunks associated with entries in the active chunk coherency list; and submit the second chunk to the memory device.

9. The non-volatile semiconductor memory module as recited in claim 1, wherein the memory controller is further operable to check the first chunk against the one or more active chunks associated with entries in the active chunk coherency list in order from latest to oldest active chunk until an overlapped active chunk is identified or all of the one or more active chunks have been checked.

10. The non-volatile semiconductor memory module as recited in claim 1, wherein each of the one or more active chunks associated with entries in the active chunk coherency list is associated with a previously received host command.

11. The non-volatile semiconductor memory module as recited in claim 1, wherein the first chunk has a size that corresponds to at least one programming unit of flash memory.

12. The non-volatile semiconductor memory module as recited in claim 11, wherein the at least one programming unit corresponds to a page of flash memory.

13. The non-volatile semiconductor memory module as recited in claim 1, wherein the memory device comprises a flash memory device.

14. A method of operating a non-volatile semiconductor memory module comprising a memory device, the method comprising:

receiving a command from a host;

splitting the command into one or more chunks, the one or more chunks comprising a first chunk associated with at least one logical block address (LBA);

checking the first chunk against an active chunk coherency list including entries associated with each of one or more active chunks to determine whether the first chunk overlaps one of the one or more active chunks at least in part by determining whether the first chunk accesses a same Logical Chunk Number (LCN) as one of the one or more active chunks;

when it is determined that the first chunk does not overlap one of the one or more active chunks, submitting the first chunk to the memory device; and when it is determined that the first chunk overlaps one of the one or more active chunks, storing a forward dependency pointer identifying the first chunk in an entry associated with the overlapped chunk and deferring submission of the first chunk to the memory device until an associated dependency link is cleared.

15. The method as recited in claim 14, wherein the entries of the active chunk coherency list each include a state indication field indicating a state associated with the respective chunk.

16. The method as recited in claim 14, further comprising clearing the dependency link after the overlapped chunk has completed execution in the memory device.

17. The method as recited in claim 14, wherein the forward dependency pointer triggers submission of the first chunk to the memory device after the overlapped chunk has completed execution in the memory device.

18. The method as recited in claim 14, further comprising determining that the first chunk overlaps one of the one or more active chunks when at least one LBA associated with the first chunk is the same as at least one LBA associated with the active chunk.

19. The method as recited in claim 14, further comprising storing the first chunk in a buffer until the dependency link is cleared.

20. The method as recited in claim 14, wherein each of the one or more active chunks associated with entries in the active chunk coherency list have not completed execution in the memory device.

21. The method as recited in claim 14, wherein the one or more chunks further comprise a second chunk, wherein the second chunk is associated with at least one LBA, and further comprising:

determining that the second chunk does not overlap any of the one or more active chunks associated with entries in the active chunk coherency list; and submitting the second chunk to the memory device.

22. The method as recited in claim 14, further comprising checking the first chunk against the one or more active chunks associated with entries in the active chunk coherency list in order from latest to oldest active chunk until an overlapped active chunk is identified or all of the one or more active chunks have been checked.

23. The method as recited in claim 14, wherein each of the one or more active chunks associated with entries in the active chunk coherency list is associated with a previously received host command.

24. The method as recited in claim 14, wherein the first chunk has a size that corresponds to at least one programming unit of flash memory.

25. The method as recited in claim 24, wherein the at least one programming unit corresponds to a page of flash memory.

26. The method as recited in claim 14, wherein the memory device comprises a flash memory device.

* * * * *